(12) United States Patent
Mitterbacher

(10) Patent No.: US 10,462,859 B2
(45) Date of Patent: Oct. 29, 2019

(54) CLOCKED FLYBACK CONVERTER CIRCUIT

(71) Applicant: TRIDONIC GMBH & CO KG, Dornbirn (AT)

(72) Inventor: Andre Mitterbacher, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 26 days.

(21) Appl. No.: 15/570,407

(22) PCT Filed: Jun. 6, 2016

(86) PCT No.: PCT/AT2016/050178
§ 371 (c)(1),
(2) Date: Oct. 30, 2017

(87) PCT Pub. No.: WO2016/197168
PCT Pub. Date: Dec. 15, 2016

(65) Prior Publication Data
US 2018/0153010 A1 May 31, 2018

(30) Foreign Application Priority Data
Jun. 11, 2015 (DE) .......................... 10 2015 210 710

(51) Int. Cl.
*H05B 33/08* (2006.01)
*H02M 3/335* (2006.01)

(52) U.S. Cl.
CPC ..... *H05B 33/0815* (2013.01); *H05B 33/0845* (2013.01); *H02M 3/33507* (2013.01)

(58) Field of Classification Search
None
See application file for complete search history.

(56) References Cited

U.S. PATENT DOCUMENTS 8,729,827 B2 * 5/2014 Esaki .................. H05B 37/02
315/297
8,891,258 B2 * 11/2014 Zhang ............... H02M 3/33507
363/21.12

(Continued)

FOREIGN PATENT DOCUMENTS

DE 102011100012 10/2012
DE 112010004983 1/2013

(Continued)

OTHER PUBLICATIONS

German search report dated Jan. 21, 2016 in German priority application 10 2015 210 710.8.

(Continued)

*Primary Examiner* — Dion Ferguson
*Assistant Examiner* — Srinivas Sathiraju
(74) *Attorney, Agent, or Firm* — Andrus Intellectual Property Law

(57) ABSTRACT

The invention relates to a clocked flyback converter circuit for directly operating lighting means comprising: a transformer (5), which has a primary winding (4), which is coupled to a controllable switch (7), and a secondary winding (6), to which the lighting means (11) can be coupled; a control unit (14) for controlling the switch (7); and means (8) for directly or indirectly sensing the current through the switch (7) in the switched-on state and for feeding a signal and reflecting said current to the control unit (14). The control unit (14) is designed to switch off the switch (7) if the signal reflecting the current has reached a variable switch-off threshold ($I_s$), to change the switch-off threshold ($I_s$) in order to change the power transmitted by the flyback converter circuit (3), and to reduce the switch-off threshold ($I_s$) for the current signal only down to a minimum value and to switch from operation in the limit mode to discontinuous operation in order to achieve a further reduction in the power (Continued)

transmitted by the flyback converter circuit (3) while the switch-off threshold ($I_s$) is fixed.

10 Claims, 4 Drawing Sheets

(56) References Cited

U.S. PATENT DOCUMENTS

| | | | | |
|---|---|---|---|---|
| 9,036,375 | B2* | 5/2015 | Langeslag | H02M 3/33507 |
| | | | | 363/21.12 |
| 9,042,124 | B1* | 5/2015 | Choi | H02M 3/33523 |
| | | | | 363/20 |
| 9,065,344 | B2* | 6/2015 | Germe | H02M 1/40 |
| 9,433,041 | B2* | 8/2016 | Mitterbacher | H05B 33/0818 |
| 9,445,464 | B2* | 9/2016 | Mitterbacher | H05B 33/0848 |
| 9,544,955 | B2* | 1/2017 | Huber | H05B 33/0818 |
| 9,655,182 | B2 | 5/2017 | Lochmann et al. | |
| 9,736,898 | B2* | 8/2017 | Doshi | H05B 37/02 |
| 9,787,191 | B2* | 10/2017 | Barrenscheen | H02M 3/33507 |
| 9,791,110 | B2* | 10/2017 | Hu | F21K 9/64 |
| 2002/0180411 | A1 | 12/2002 | Bub et al. | |
| 2008/0278086 | A1 | 11/2008 | Chitta et al. | |
| 2012/0133295 | A1 | 5/2012 | Pereira et al. | |
| 2012/0169240 | A1* | 7/2012 | Macfarlane | H02M 1/4225 |
| | | | | 315/152 |
| 2012/0262087 | A1 | 10/2012 | Watanabe et al. | |
| 2012/0286686 | A1 | 11/2012 | Watanabe et al. | |
| 2013/0076257 | A1* | 3/2013 | Hsieh | H05B 33/0818 |
| | | | | 315/201 |
| 2013/0113375 | A1* | 5/2013 | Leung | H05B 33/0815 |
| | | | | 315/85 |
| 2014/0035476 | A1* | 2/2014 | Hwang | H05B 33/0815 |
| | | | | 315/201 |
| 2014/0103828 | A1* | 4/2014 | Hsieh | H05B 33/0818 |
| | | | | 315/201 |
| 2014/0117868 | A1* | 5/2014 | Lopez | H05B 33/0815 |
| | | | | 315/201 |
| 2014/0125247 | A1 | 5/2014 | Mitterbacher | |
| 2014/0132179 | A1* | 5/2014 | McAuliffe | H02M 3/156 |
| | | | | 315/291 |
| 2015/0003118 | A1* | 1/2015 | Shin | H02M 1/36 |
| | | | | 363/21.12 |
| 2015/0042237 | A1 | 2/2015 | Huber | |
| 2015/0054421 | A1* | 2/2015 | Auer | H05B 33/0809 |
| | | | | 315/247 |
| 2015/0077003 | A1 | 3/2015 | Vonach et al. | |
| 2015/0084544 | A1* | 3/2015 | Mitterbacher | H05B 33/0818 |
| | | | | 315/294 |
| 2015/0207418 | A1* | 7/2015 | Eum | H02M 3/33523 |
| | | | | 363/21.12 |
| 2015/0230300 | A1* | 8/2015 | Knoedgen | H05B 33/0815 |
| | | | | 315/219 |
| 2015/0244273 | A1* | 8/2015 | Schaemann | H05B 33/0815 |
| | | | | 363/21.18 |
| 2015/0264758 | A1* | 9/2015 | McDougle | H05B 33/0815 |
| | | | | 315/307 |
| 2015/0318787 | A1* | 11/2015 | Chitta | H02M 1/08 |
| | | | | 315/307 |
| 2015/0373811 | A1* | 12/2015 | Dunser | H05B 33/0815 |
| | | | | 315/185 R |
| 2016/0204700 | A1* | 7/2016 | Mayer | H02M 3/156 |
| | | | | 315/224 |
| 2016/0336861 | A1* | 11/2016 | Gritti | H02M 3/33523 |
| 2017/0079098 | A1* | 3/2017 | Mitterbacher | H02M 3/33523 |
| 2018/0063910 | A1 | 3/2018 | Schonberger et al. | |

FOREIGN PATENT DOCUMENTS

| | | |
|---|---|---|
| DE | 10 2011 088 966 | 6/2013 |
| DE | 102012007479 | 10/2013 |
| DE | 102013207038 | 5/2014 |
| DE | 102013216877 | 2/2015 |
| EP | 1835605 | 9/2007 |
| EP | 2 341 760 | 7/2011 |
| EP | 2 512 208 | 10/2012 |
| WO | 2007135454 | 11/2007 |
| WO | 2010118944 | 10/2010 |
| WO | 2013092734 | 6/2013 |
| WO | 2013152368 | 10/2013 |
| WO | 2012167294 | 12/2013 |
| WO | 2014176609 | 11/2014 |

OTHER PUBLICATIONS

PCT International Search Report dated Aug. 10, 2016 in parent PCT application PCT/AT2016/050178.

Liu, Sheng, et al., An Adaptive On-Time Controlled Boost LED Driver with High Dimming Ratio, IECON 2012—38th Annual Conference on IEEE Industrial Electronics Society, vol., no., pp. 210, 214, Oct. 25-28, 2012.

* cited by examiner

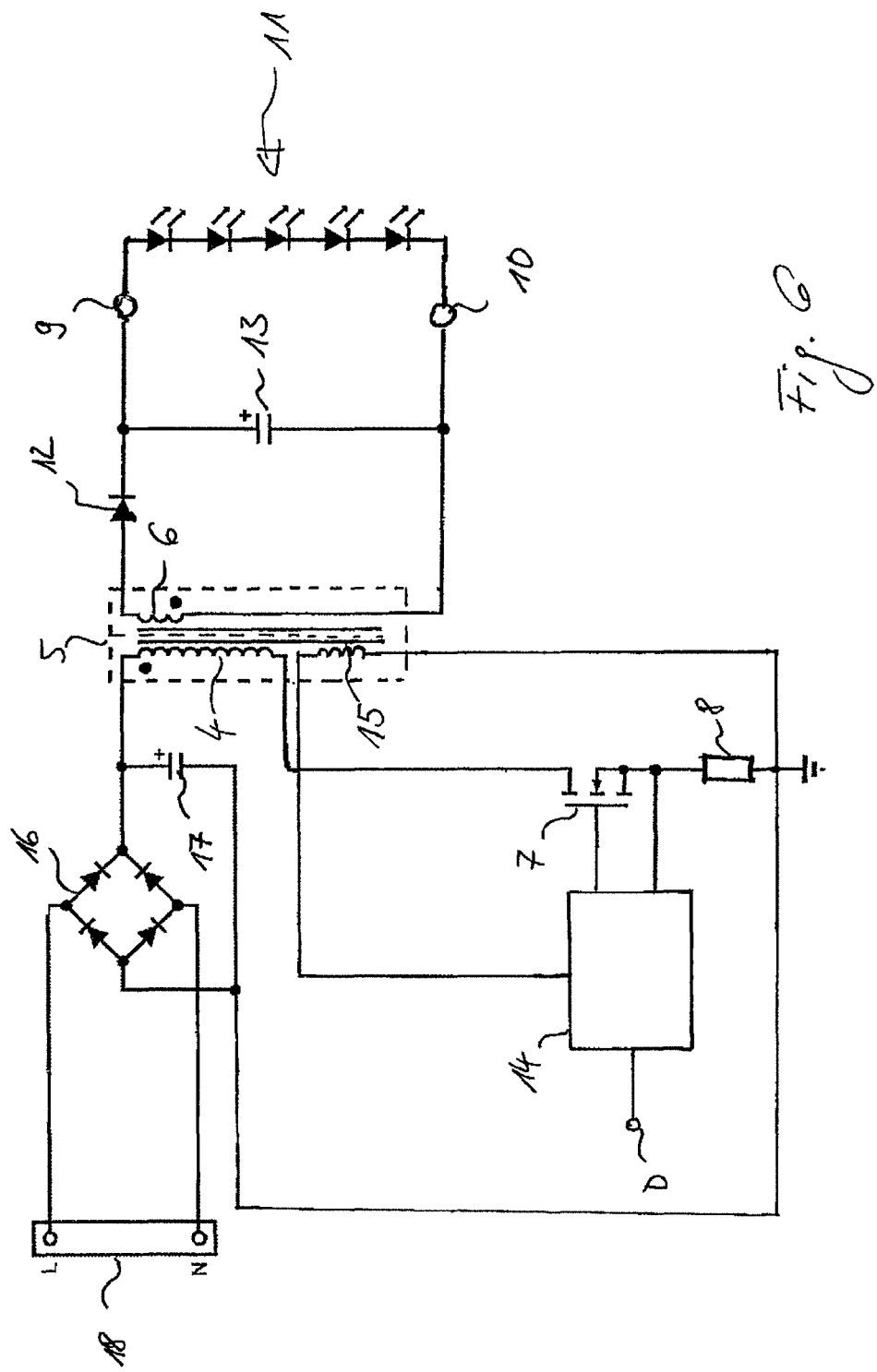

CLOCKED FLYBACK CONVERTER CIRCUIT

CROSS REFERENCE TO RELATED APPLICATIONS

The present application is the U.S. national stage application of International Application PCT/AT2016/050178, filed Jun. 6, 2016, which international application was published on Dec. 15, 2016 as International Publication WO 2016/197168 A1. The International Application claims priority to German Patent Application 10 2015 210 710.8, filed Jun. 11, 2015.

FIELD OF THE INVENTION

The present invention relates to a clocked flyback converter circuit and a method for controlling a clocked flyback converter circuit. The invention relates in particular to a clocked flyback converter for direct operation of one or more light emitting diodes.

BACKGROUND OF THE INVENTION

The A flyback converter, also known as a buck-boost converter, is a DC voltage converter, which conveys galvanically decoupled electrical energy between an input and output by means of a transformer. With a flyback converter, a DC voltage supplied to the input can be converted to a DC voltage with another voltage level with little circuitry complexity.

A clocked flyback converter circuit is known from WO 2012/167294 A1, in which a control unit for the primary coil of the transformer controls a grounded switch to be switched on and off for selective clocking of the flyback converter with a specific frequency and switched-on period. The current flowing through the controllable switch is monitored after the switch has been switched off, and the switch is switched back on at a zero crossing of the current. WO 2012/167294 A1 proposes the use of such a clocked flyback converter circuit for a direct power supply to a light emitting diode (LED).

WO 2012/167294 A1 does not disclose, however, how dimming or varying the output power can take place with a direct operation of one or more light emitting diodes on the flyback converter circuit, in particular without a further, actively clocked converter stage.

The light emission of a light emitting diode is a function of the current flow through the light emitting diode. In order to control or regulate the brightness, light emitting diodes are therefore typically operated in a mode in which the current flow through the light emitting diode is modified by an operating device.

WO 2013/092734 A1 discloses a converter for controlling the brightness (dimming) of light emitting diodes by means of pulse width modulation (PWM), in which the duty cycle is modified in a first and second dimming range with a first or second constant amplitude of the LED current, in order to cover a large overall dimming range. The brightness control takes place here only according to a dimmer setting.

For precise control or regulation, in particular with different loads, measurement values must be recorded by the control unit, in order to be able to counteract any potential deviations from predefined operating parameters, such as light color and brightness, or shifting in the light spectrum at different dimming levels.

In order to record the measurement values and generate corresponding signals that can be supplied to and processed by the control circuit, additional components/circuits are needed, making the overall construction complex and expensive.

The invention presents devices and methods that reduce the problems described above. In particular, the object is to create a clocked flyback converter circuit for direct operation of one or more light emitting diodes, and a method for controlling a flyback converter circuit, which allow for a precise control and regulation over a large load range with a simple and inexpensive construction.

This object is achieved in accordance with the features described herein.

SUMMARY OF THE INVENTION

According to the present invention, a clocked flyback converter circuit for operating one or more lighting means comprises a controllable switch, a transformer that has a primary winding coupled to the controllable switch, and a secondary winding, to which the lighting means can be coupled, a control unit for activating the switch, and means for direct or indirect detection of the current through the switch in the switched-on state, and for supplying a signal reflecting this current to the control unit. In order to cover a large load/dimming range, and to also enable a precise control or regulation at low load/dimmer ranges, the flyback converter circuit functions in the limit mode, and it functions in a discontinuous operation at low load/dimming ranges.

As soon as the signal reflecting the current reaches a variable switch-off threshold for modifying/adjusting the power transmitted by the flyback converter circuit, the control unit switches the switch back off. The switch-off threshold is only reduced by the control unit to a predefined minimum value, and the control unit switches from the limit mode to the discontinuous operation, with a switch-off threshold fixed at a minimum value, in order to obtain a further reduction of the power transmitted by the flyback converter circuit.

The lighting means can be one or more light emitting diodes.

The control unit can be configured such that it switches off the switch in both the limit mode as well as the discontinuous operation as soon the signal reflecting the current reaches the switch-off threshold or the predefined minimum value.

The control unit can have a comparator for comparing the signal reflecting the current with a signal representing the minimum value.

The control unit can be configured such that the switch-off threshold is modified in the limit mode and/or at the point in time when the switch is switched back on in the discontinuous operation, in accordance with a dimming signal supplied to the control unit.

The transformer advantageously has a primary-side auxiliary winding connected to the control unit in order to determine a curve of the voltage decreasing over the auxiliary winding, wherein the control unit switches the switch back on in the discontinuous operation at a point in time at which this voltage is zero after a minimum in the voltage curve.

The control unit can determine a point in time in the discontinuous operation for switching the switch back on, corresponding to the transmitted power and, when the point in time in a cycle at which the voltage through the auxiliary winding is zero after a minimum in the voltage curve, and at which the switch is switched back on, lies after the determined point in time, switch the switch back on in a subsequent cycle at a point in time at which the voltage through the auxiliary winding is zero after a minimum in the voltage curve, and lies prior to the determined point in time.

Alternatively or additionally, the control unit can continuously determine a mean current output to the lighting means based on the actual point in time at which the switch is switched back on, and regulate the mean current to a predefined mean current corresponding to the power that is to be transmitted by changing the point in time at which the switch is switched back on, wherein a difference between the predefined mean current for a switch-on cycle and the actual mean current forms the switch-on cycle, and this difference is added to the predefined mean current for the next switch-on cycle. The point in time at which the switch is switched back on depends in each cycle on a minimum, in particular a zero-crossing of the voltage curve.

An operating device for light emitting diodes in accordance with the present invention has one of the clocked flyback converter circuits described above.

According to the present invention, a method for controlling a clocked flyback converter circuit that has a transformer, in which a primary winding of the transformer is coupled to a controllable switch, and a secondary winding of the transformer is coupled to one or more lighting means, includes the following steps: activation of the switch; and recording the current flowing through the switch and generation of a signal reflecting this current; wherein the switch is switched off when the signal indicates that the current has reached a variable switch-off threshold, and the switch-off threshold is modified in order to change the power that is to be transmitted through the flyback converter circuit, wherein the switch-off threshold is only reduced to a minimum value, and in order to obtain a further reduction of the power transmitted through the flyback converter circuit (3), with a fixed switch-off threshold, the operation is changed from the limit mode to the discontinuous operation.

The invention shall be explained in greater detail below, based on the attached drawings.

BRIEF DESCRIPTION OF THE DRAWINGS

FIG. 6 shows an operating device for light emitting diodes according to one exemplary embodiment in accordance with the present invention.

Components having the same function are indicated with the same reference symbols in the Figures.

DETAILED DESCRIPTION

Figure 1:
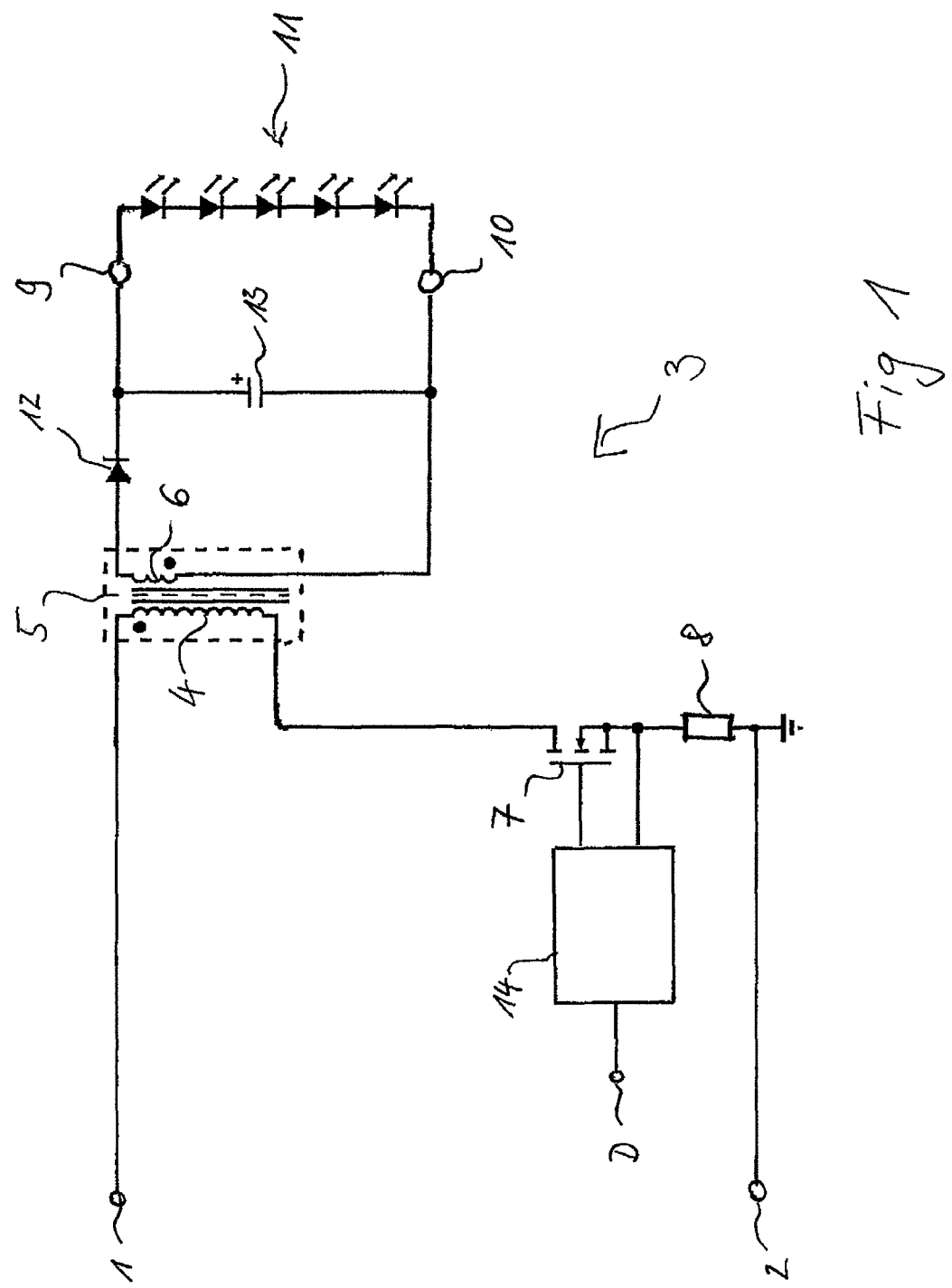
FIG. 1 shows a clocked flyback converter circuit according to a first exemplary embodiment in accordance with the present invention.

FIG. 1 shows a simplified circuit of a clocked flyback converter for direct operation of one or more lighting means according to a first exemplary embodiment in accordance with the present invention. A supply voltage is provided at the two input terminals 1, 2 of the illustrated flyback converter circuit 3, which can be a DC voltage or a rectified AC voltage.

The primary winding 4 of the transformer 5, the controllable switch 7 and a measuring resistor 8 are connected in series between the first input terminal 1 and the second input terminal 2. The second input terminal 2 is grounded. An LED strip 11, formed in the example by five LEDs connected in series, is connected to the two output terminals 9, 10 of the flyback converter circuit 3. The secondary winding 6 of the transformer 5 and a diode 12 are connected in series between the first output terminal 9 and the second output terminal 10. A capacitor 13 is coupled in parallel to the output terminals 9, 10. The primary and secondary windings 4, 6 of the transformer 5 have different polarities/winding directions.

The controllable switch 7 can be circuit breaker, a field effect transistor, or a bipolar transistor. The controllable switch 7 can be a transistor with an isolated gate electrode.

A control unit 14 connected to the switch 7 activates the switch 7, in order to switch it on and off. The control unit 14 is supplied with a dimming signal D for controlling the brightness of the LED strip 11 (varying the output power), and a signal for the voltage decreasing over the measuring resistor, in order to record the current flowing through the switch 7.

The control unit 14 can be an integrated semiconductor circuit or comprise an integrated semiconductor circuit. The control unit 14 can be configured as a processor, a microprocessor, a controller, a microcontroller, or an application specific integrated circuit (ASIC), or a combination of these units.

With the clocked flyback converter 3, electrical energy is transmitted between the input terminals 1, 2 and the output terminals 9, 10, which are galvanically separated by means of the transformer 5. For this, the control unit 14 repeatedly switches the switch 7 on and off. After it has been switched on, current flows through the primary winding 4 of the transformer 5, and the diode 12 suppresses current flow on the secondary side. After it has been switched off (flyback phase), the energy stored in the primary winding 4 is discharged via the secondary winding 6 of the transformer 5, and the diode 12 causes a current to flow through the secondary side. The capacitor 13 is charged, and the LED strip 11 connected to the output terminals 9, 10 of the flyback converter circuit 1 lights up. The current flow at the secondary side decreases linearly, and ultimately reaches zero in the discontinuous (intermittent) mode as well as in the limit mode, before the control unit 14 switches the switch 7 back on.

According to the present invention, a dimming or variation of the output power, in which the flyback converter 3 is operated in a limit mode, takes place by varying the current value until the current through the primary winding 4 of the transformer 5 and the switch 7 increases linearly after the switch has been switched on. Upon reaching this predefined current value, the switch 7 is switched off. The value of the predefined current value determines the brightness in this mode.

Figure 2:
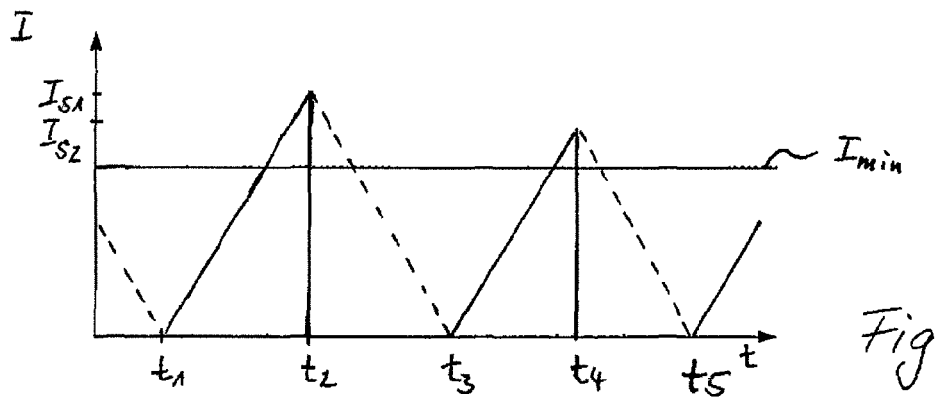
FIG. 2 shows a diagram with signal curves of the flyback converter circuit operated in the limit mode, according to one exemplary embodiment in accordance with the present invention.

FIG. 2 shows, in a simplified depiction, the temporal curves of the currents through the primary winding 4 and the switch 7 (continuous line) and the currents through the secondary winding 6 (broken line) of the flyback converter 3 operated in the limit mode. As can be seen in the diagram in FIG. 2, the control unit 14 switches the switch 7 on at a point in time $t_1$. The current flow through the switch 7 is determined by means of the voltage decreasing over the measuring resistor 8 and by the voltage recorded by the control unit 14.

After the switching on at the point in time $t_1$, the current through the primary winding 4 and the switch 7 (continuous line) increases linearly to a predefined current value $I_{s1}$, which is set by the control unit 14 based on the dimming signal D (power requirement).

The control unit 14 compares the current switch current, or the voltage decreasing at the resistor 8 that reflects the switch current, with the threshold value $I_{s1}$, and causes the switch 7 to be switched off as soon as the current through the switch 7 reaches the threshold value $I_{s1}$ (switch-of threshold).

The predefined current value $I_{s1}$ is reached at the point in time $t_2$, and the control unit 14 switches the switch 7 off. The current flow through the secondary winding 6 (broken line) begins and drops to zero at the point in time $t_3$, at which point the control unit 14 switches the switch 7 back on (limit mode). A switching back on can also first take place at a positive flank (zero crossing) of the coil current.

For the cycle following the cycles t1 to t3, the switch-off threshold is lowered to $I_{s2}$ by the control unit 14 due to a reduced power requirement via the dimming signal D, such that after the switch 7 has been switched on at the point in time $t_3$, the current through the primary winding 4 and the switch (continuous line) again increases, but only to the predefined current value $I_{s2}$, because the control unit 14 switches the switch 7 off at the point in time $t_4$, and switches it back on (limit mode) at the point in time $t_5$ after the current through the secondary winding 6 (broken line) decreases to zero.

According to the present invention, when the power requirement decreases, the switch-off threshold cannot be reduced below the minimum value $I_{min}$ shown in the diagram in FIG. 2. This minimum value $I_{mim}$ can be selected such that it is not possible to reliably record/detect the low current flow through the switch 7 at levels below this minimum switch-off threshold.

If the switch-off threshold lies below the minimum value $I_{min}$ when the power requirements are reduced and the switch-off threshold is decreased accordingly, the control unit 14 then switches, in accordance with the present invention, from the limit mode to the discontinuous operating mode. For this, the control unit 14 compares the switch-off threshold that is to be set in accordance with the dimming signal D with the minimum value $I_{min}$. In the discontinuous operating mode, the required further reduction of the power output by the flyback converter 3 then takes place through an extension of the switched-off period of the switch 7 with a switch-off threshold set to the minimum value $I_{min}$.

Figure 3:
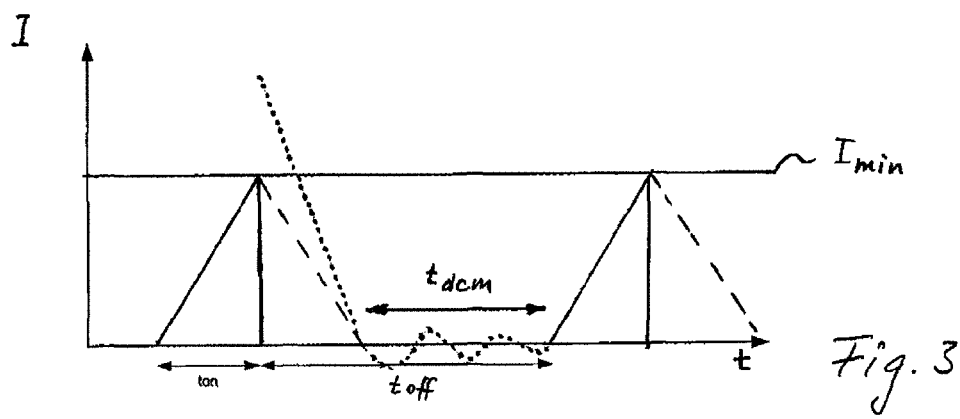
FIG. 3 shows a diagram with signal curves of the flyback converter circuit operated in the discontinuous operating mode, according to one exemplary embodiment in accordance with the present invention.

The diagram in FIG. 3 shows the temporal curves of the currents through the primary winding 4 and the switch 7 (continuous line) and the currents through the secondary winding 6 (broken line) of the flyback converter 3 operated in the discontinuous operating mode. As is shown in FIG. 3, the control unit 14 switches the switch 7 off as soon as the current flowing through the switch 7 (continuous line) reaches the minimum value $I_{min}$, the fixed switch-off threshold, and does not immediately switch the switch 7 back on after the reduction of the current through the secondary winding 6 (broken line) to zero, but first after a time period $t_{dcm}$ set according to the power that is to be supplied, after the current through the secondary winding 6 (broken line) has decreased to zero. In the discontinuous operating mode, the switch 7 is always switched off upon reaching the fixed switch-off threshold, and an increase in the power output takes place with a corresponding reduction of the time period $t_{dcm}$ and a reduction of the output power takes place with a corresponding increase in the time period $t_{dcm}$.

If the time period $t_{dcm}$ lies below a minimum value or at zero when the power requirement is increased and the time period $t_{dcm}$ is reduced accordingly, the control unit 14 switches, in accordance with the present invention, from the discontinuous operating mode to the limit mode. For this, the control unit 14 compares the time period $t_{dcm}$ that is to be set in accordance with the dimming signal D with the minimum value, or checks whether the time period $t_{dcm}$ is zero or nearly zero.

Figure 4:
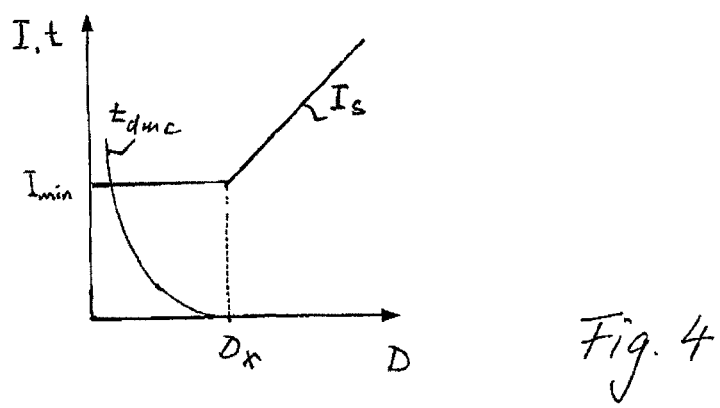
FIG. 4 shows a diagram with curves of control variables in the limit mode and the discontinuous operation.

FIG. 4 illustrates the transition between the different operating modes. In the diagram shown in FIG. 4, the threshold value $I_s$ that is to be set by the control unit 14, and the time period $t_{dcm}$ that is to be set by the control unit 14 are depicted as a function of the level of the dimming signal D sent to the control unit 14. As can be seen in the diagram in FIG. 4, a threshold value $I_s$ that is to be set increases linearly above a level $D_x$, when the level of the dimming signal D is increased, while the time period $t_{dcm}$ is zero. Below the level $D_x$, the shut-off threshold that is to be set is constant, or fixed to a minimum value $I_{min}$, while the time period $t_{dcm}$ increases in a non-linear manner when the level of the dimming signal D decreases below $D_x$. The curves depicted therein can be calculated by the control unit 14, or stored previously in the control unit 14 in the form of a table.

In the discontinuous operation, oscillations in the voltage over the primary-side coil 4 may occur due to parasitic effects after switching the switch 7 off. In order to prevent switching losses of the switch 7, such oscillations should be taken into account when selecting the point in time at which it is switched back on, or the point in time at which it is switched back on should be selected such that the voltage oscillations take place at a zero crossing after a voltage minimum at the point in time at which it is switched back on.

Figure 5:
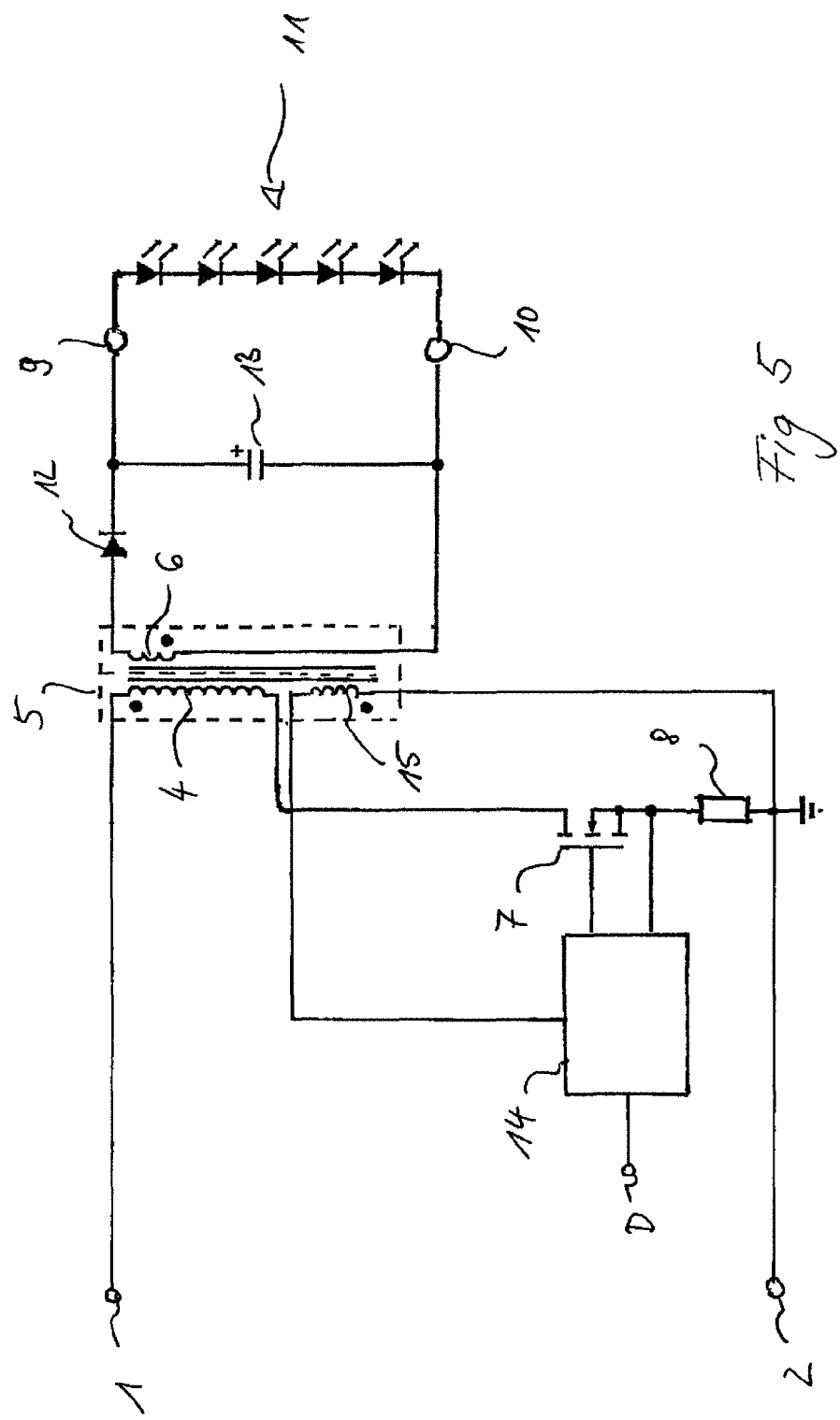
FIG. 5 shows a clocked flyback converter circuit according to a second exemplary embodiment in accordance with the present invention.

FIG. 5 shows a clocked flyback converter circuit according to a second exemplary embodiment in accordance with the present invention, in which the transformer 5 has a primary-side auxiliary winding 15 for recording this voltage curve. The auxiliary winding 15 is connected to the second input terminal 2 and the control mechanism 15. In the discontinuous operation, the control unit 14 determines the point in time at which the voltage curve has a zero crossing after a minimum by means of the voltage signal generated by the auxiliary winding, in order to switch the switch back on at this point in time.

In the diagram shown in FIG. 3, the oscillation of the voltage signal after the switching off is shown as a dotted line. If the switching back on of the switch 7 is to take place taking the recorded oscillation into account, this means, however, that the switching back on of the switch 5 cannot take place at an arbitrary point in time, but only at discrete intervals, specifically at the point when the voltage oscillation has a zero crossing.

If the switch 7 is not switched back on precisely at the point in time determined by the control unit 14 in accordance with the load requirement due to these voltage oscillations and the point in time at which it is switched back on at the zero crossing resulting from these oscillations, the predefined power, the predefined temporal mean value of the current $I_{avg}$ output at the secondary-side cannot be reached precisely for this switch-on cycle, and is lower, when it is first switched back on later, for example, at a next possible discrete point in time.

In order to compensate for this error, the control unit 14 can switch the switch 7 back on (prematurely) in the next cycle at a discrete point in time lying prior to the point in time determined in accordance with the load requirement, such that a premature switching back on alternates with a switching back on at a discrete point in time, which lies after the point in time determined in accordance with the load requirement.

The control unit 14 can be configured to determine the extent of the error, i.e. the deviation between the point in time determined in accordance with the load requirement and the actual point in time for the switching back on, and to trigger the premature switching back on starting at a specific extent of the error. The error can be determined for only one switch-on cycle, or for compounded for numerous cycles, wherein a premature switching back on is triggered for a next switch-on cycle as soon as the compounded error (overall error) of the successive cycles reaches a specific value.

Alternatively or additionally, the control unit 14 can continuously determine the actual, current mean current $I_{avg}$ on the basis of the actual point in time of switching back on, and regulate the mean current $I_{avg}$ by a corresponding adaptation/modification of the time period $t_{dcm}$, wherein a difference between the predefined mean current for the previous switch-on cycle and the actual mean current $I_{avg}$ of the previous switch-on cycle is formed, and this difference can be added to the predefined mean current for the next switch-on cycle.

According to the present invention, an alternating of the discontinuous operating mode and the limit mode can take place when the load formed by the LED(s) is so low that the upper switch-off threshold L resulting in a limit mode would lie below the predefined minimum value $I_{min}$.

This alternating can lead, in particular in a transition region, to a more precise mean current $I_{avg}$ over two switch-on cycles/periods, because a too low mean current $I_{avg}$ resulting from the discontinuous operating mode (when switched back on at a next possible discrete, later point in time) can be compensated for with the too high mean current $I_{avg}$ in the subsequent limit mode.

The end of the alternating operation, or the transition from the alternating operation to an ongoing discontinuous operating mode can be triggered by means of a received control signal, or it can be dependent on the level of the dimming signal D or the length of the time period $t_{dcm}$ of the discontinuous operating mode, wherein an end of the alternating operation, or the transition from the alternating operation to an ongoing discontinuous operating mode takes place when the length assumes a maximum value.

In the same manner, a transition from a further ongoing discontinuous operating mode to the alternating operation can be triggered by means of a received control signal or it can be dependent on the level of the dimming signal D or the length of the time period $t_{dcm}$ of the discontinuous operating mode, wherein a starting of an alternating operation, or the transition from an ongoing discontinuous operating mode to the alternating operation takes place when the length assumes a minimum value. The minimum value and the maximum value can be the same.

FIG. 6 shows an operating device for light emitting diodes according to an exemplary embodiment in accordance with the present invention. The operating device has the clocked flyback converter circuit shown in FIG. 5 and a rectifier comprised of a diode circuit 16 and a charging capacitor 17, for rectifying an AC voltage supplied to the input terminal 18. The operating device can comprise a power factor correction circuit (not shown) disposed between the diode circuit 16 and the charging capacitor 17.

The LEDs of the LED strip 11 connected to the output terminals 8, 10 can be inorganic or organic LEDs. The LEDs can be connected in series or parallel. The numerous LEDs can also be connected in more complex arrangements, e.g. in numerous serial connections connected in parallel to one another. Although only five LEDs are depicted, the lighting means, or the LED strip 11 can also have more or fewer LEDs.

Alternatively, the operating device can have the flyback converter circuit shown in FIG. 1.

What is claimed is:

1. A clocked flyback converter circuit for operating one or more lighting means (11), comprising:
   a controllable switch (7);
   a transformer (5) having a primary winding (4), which is coupled to the controllable switch (7), and a secondary winding (6), to which lighting means (11) can be coupled;
   a control device (14) for activating the switch (7); and
   means (8) for direct or indirect recording of the current through the switch (7) in the switched-on state, and for supplying a signal reflecting this current to the control unit (14);
   wherein the control unit (14) is configured to switch the switch (7) off when the signal reflecting the current has reached a variable switch-off threshold ($I_s$), to modify the switch-off threshold ($I_s$) for modifying the power transmitted by the flyback converter circuit (3) but not below a minimum value ($I_{min}$), and to switch from operation in the limit mode to operation in a discontinuous mode in order to obtain a further reduction of the power transmitted by the flyback converter circuit (3) where the minimum value ($I_{min}$) serves as a fixed switch-off threshold; and wherein the transformer (5) has a primary-side auxiliary winding (15), to which the control unit (14) is coupled in order to record a voltage curve over the auxiliary winding (15), and the control unit (14) switches the switch back on when operating in the discontinuous mode at a point in time at which the voltage is at a zero crossing after a local minimum in the voltage curve; and further wherein a dimming signal (D) can be sent to the control unit (14), and the control unit is configured to modify the switch-off threshold (Is) in accordance with the dimming signal in the limit mode, and is configured to modify the point in time of switching the switch back on in accordance with the dimming signal (D) in the discontinuous mode when the minimum value (Imin) serves as the fixed switch off threshold.

2. The clocked flyback converter circuit according to claim 1, wherein the lighting means (11) is or are light emitting diodes.

3. The clocked flyback converter circuit according to claim 1, wherein the control unit (14) is configured to switch off the switch (7) in both the limit mode and the discontinuous mode, based on the signal reflecting the current that is supplied.

4. The clocked flyback converter circuit according to claim 1, wherein the control unit (14) has a comparator for comparing the signal reflecting the current with a signal representing the minimum value ($I_{min}$).

5. The clocked flyback converter circuit according to claim 1, wherein the control unit (14) is configured to determine a point in time in a cycle for the switching back on of the switch (7) in the discontinuous mode, as the voltage through the auxiliary winding (15) is zero after a minimum in the voltage curve corresponding to the transmitted power, and further wherein the switch (7) is switched back on at this determined point in time for one or more cycles, and the switch (7) back on in a subsequent cycle at a point in time in the subsequent cycle at which the voltage through the auxiliary winding (15) is zero after a local minimum in the voltage curve prior to said determined point in time of the cycle.

6. The clocked flyback converter circuit according to claim 1, wherein the control unit (14) is configured to continuously determine a mean current supplied to the lighting means (11) in the discontinuous mode, based on the actual point in time at which the switch (7) is switched back on, and to regulate the mean current to a predefined mean current corresponding to the power that is to be transmitted through a modification of the point in time of the switching back on, wherein a difference between the predefined mean current for a switch-on cycle and the actual mean current of the switch-on cycle is formed, and this difference is added to the predefined mean current for the next switch-on cycle.

7. An operating device for light emitting diodes, comprising a clocked flyback converter circuit (3) according to claim 1.

8. A method for controlling a clocked converter circuit (3) that has a transformer (5), in which a primary winding (4) of the transformer is coupled to a controllable switch (3) and a secondary winding (2) of the transformer (5) is coupled to one or more lighting means (11), comprising the steps:
  activating the switch (7); and
  recording the current flowing through the switch (7), and generating a signal reflecting this current;
  wherein in a limit mode of operation the switch (7) is switched off when the signal indicates that the current has reached a variable switch-off threshold ($I_s$), and the switch-off threshold ($I_s$) is modified in the limit mode of operation in order to modify the power that is to be transmitted by the converter circuit (3), wherein the switch-off threshold ($I_s$) is not reduced below a minimum value ($I_{min}$); and
  further wherein in a discontinuous mode of operation the minimum value ($I_{min}$) serves as a fixed switch-off threshold ($I_s$) and the switch (7) is switched off at the fixed switch threshold and remains off during a cycle for a period of time after the current flowing through the switch reaches zero before the switch is switched on for the next cycle, in order to obtain a further reduction of the power transmitted by converter circuit (3); and
  further comprising the steps of: using a transformer (5) with a primary-side auxiliary winding (15) to record a voltage curve over the auxiliary winding (15); and
when operating in the discontinuous mode, switching the switch back on at a point in time at which the voltage is at a zero crossing after a local minimum in the voltage curve; and further comprising the steps of:
  in the limit mode, modifying the switch-off threshold (Is) in accordance with a dimming signal(D); and
  in the discontinuous mode, modifying the point in time of switching the switch back on in accordance with the dimming signal (D).

9. The method according to claim 8 further comprising the steps of:
  in the discontinuous mode, determining a point in time in a cycle for the switching back on of the switch (7) as time corresponding to the transmitted power when the voltage through the auxiliary winding (15) is zero after a minimum in the voltage curve;
  switching the switch (7) switched back on at this determined point in time for one or more cycles; and
  switching the switch (7) back on in a subsequent cycle at a point in time in the subsequent cycle at which the voltage through the auxiliary winding (15) is zero after a local minimum in the voltage curve prior to said previously determined point in time of the cycle.

10. The method according to claim 8 further comprising the steps of:
  continuously determining a mean current supplied to the lighting means (11) in the discontinuous mode, based on the actual point in time at which the switch (7) is switched back on; and
  regulating the mean current to a predefined mean current corresponding to the power that is to be transmitted by modifying the point in time that the switch is switched back on, wherein a difference between the predefined mean current for a switch-on cycle and the actual mean current of the switch-on cycle is formed, and this difference is added to the predefined mean current for the next switch-on cycle.

* * * * *